United States Patent Office 3,010,934
Patented Nov. 28, 1961

3,010,934
METHOD FOR MAKING POLYURETHANE ELASTOMER AND PRODUCT THEREOF
Günther Nischk, Leverkusen, Germany, assignor, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed Sept. 29, 1958, Ser. No. 763,840
Claims priority, application Germany Sept. 30, 1953
8 Claims. (Cl. 260—45.4)

This invention relates to a process for the production of highly elastic cross-linked products and, more particularly, to a process for the production of highly elastic polyurethane elastomers.

This application is a continuation in part of United States patent application Serial Number 458,958, filed September 28, 1954, by Gunther Nischk.

Processes have heretofore been known in which linear saturated polyesters containing hydroxyl groups are converted in various ways into cross-linked products having elastic properties similar to those of rubber by reaction with organic polyisocyanates. Synthetic elastomers with particularly highgrade elastic properties similar to those of rubber may be produced by a polyaddition process. According to this process, the chain length of a linear saturated polyester containing hydroxyl groups is increased in a first step by the addition of an excess of an organic polyisocyanate. The polyisocyanate-modified polyester thus obtained is then cross-linked with water, a glycol, or a diamine. In this manner synthetic elastomers are obtained by cross-linking through urethane groups or urea groups. When these reactions are carried out with weakly unsaturated polyesters which contain reactive double bonds, i.e., polyesters which can be obtained in a manner known by the concurrent use of an unsaturated dicarboxylic acid, such as maleic acid, for example, as an esterifying component, it is impossible to obtain materials having good mechanical properties like those obtained in the aforesaid saturated polyesters.

It is an object of the invention to provide highly elastic cross-linked products. It is another object of the invention to provide improved polyurethane elastomers. Another object of the invention is to provide a process for the production of highly elastic polyurethane elastomers. Still another object of the invention is to provide a process for the manufacture of a liquid reaction mixture adapted to be cast and cured into shaped articles of highly elastic polyurethane elastomers.

The above objects and others are accomplished, generally speaking, by providing polyurethane solid elastomers which are obtained from a mixture of unsaturated and saturated polyesters. The mixture is reacted in a known manner, in a first step, with a quantity of organic polyisocyanate which is in excess of the amount calculated on the terminal hydroxyl groups of the mixed polyesters. The polyisocyanate modified polyesters in a second step are reacted with a compound containing at least two active hydrogen atoms capable of reacting with isocyanate groups. The proportion of the compound having active hydrogen atoms added in the second step is so chosen that after the compound has been added free isocyanate groups are available to allow cross-linking through urethane or urea groups, concurrent with thermal polymerization of the polyester chains containing double bonds.

The invention is predicated on the surprising discovery that highly elastic polyurethane elastomers having excellent mechanical properties may be obtained if a mixture of unsaturated polyesters and saturated polyesters are reacted in a first step with organic polyisocyanate and in a second step with a compound having at least two active hydrogen atoms.

Broadly, the invention contemplates any mixture of a linear saturated polyester with a linear unsaturated polyester, both of which contain terminal hydroxyl groups. However, it is preferred that the proportion of the unsaturated polyester in the mixture should not exceed 33% by weight inasmuch as there may be a deterioration in the mechanical properties of the final product if larger quantities of the unsaturated polyesters are used. Preferably, the polyester mixture should contain from about 10% to about 20% of the unsaturated polyesters and about 90% to about 80% of the saturated polyesters.

The polyesters which are employed in the process of the invention are preferably prepared from aliphatic dicarboxylic acids and glycols. Both the saturated and the unsaturated polyesters of this invention may have an acid number of from zero up to about 10 but, preferably, from zero to about 2, and an OH number of from about 20 to about 100, preferably, of from about 40 to about 70.

Any suitable saturated dicarboxylic acid may be employed to prepare the saturated polyesters of the present invention, such as, for example; malonic acid, succinic acid, adipic acid, methyl adipic acid, dihydromuconic acid, thiodipropionic acid, diethylether dicarboxylic acid, sebacic acid, and suberic acid. Any suitable glycol may be employed, such as, for example, ethylene glycol, 1,2-propylene glycol, 1,3-propylene glycol, 1,3-butylene glycol, 1,4-butylene glycol, 1,6-hexanediol, methyl-hexanediol-1,6, 1,4-butinediol, diethylene glycol, thiodiglycol, and 2,2'-dimethyl-1,3-propylene glycol.

Any suitable unsaturated hydroxyl polyester may be used according to the invention. Suitable unsaturated hydroxyl polyesters are those which are composed of aliphatic components and which may be produced by thermal esterification of saturated dicarboxylic acids, such as, those listed above, for example, adipic acid, in admixture with unsaturated dicarboxylic acids, such as, for example, maleic acid, fumaric acid, itaconic acid, citraconic acid, dihydromuconic acid, cyclohexenyl succinic acid, and isobutenyl succinic acid, and the corresponding anhydrides, with any of the glycols as listed above, for example, ethylene glycol. It is preferred that the molar ratio of unsaturated dicarboxylic acid to saturated dicarboxylic acid be between from about 1:1 to about 1:15. In other words, one mol of unsaturated dicarboxylic acid to one mol of saturated dicarboxylic acid; and about one mol of unsaturated dicarboxylic acid to about 15 mols of saturated dicarboxylic acid.

Any suitable organic polyisocyanate may be used in accordance with the present invention, such as, for example, p-phenylene diisocyanate, 4,4'-diphenyl methane diisocyanate, 1,4-naphthalene diisocyanate, 4,4'-diphenyl diisocyanate, and the tolylene diisocyanates, such as 2,4-tolylene diisocyanate, and 4,4',4"-triisocyanate triphenyl methane. As stated above, the polyisocyanate component is used in excess of the hydroxyl groups present in the polyester mixture. Generally, in excess of from about 20% to about 250% is employed in the practice of the invention.

Any suitable compound having at least two active hydrogen atoms capable of reacting with isocyanate groups and a molecular weight less than about 500 may be used for cross-linking in accordance with the invention, such as, for example, butylene glycol and quinitol; ether glycols, such as, dihydroxyethyl-1,5-naphthalene ether; diamines, such as, 3,3'-di-chlorobenzidine and 2,6-dichloro-1,4-phenylene-diamine; amino alcohols, such as, amino ethanol; and water.

In accordance with a preferred embodiment of the invention a mixture of the saturated and unsaturated polyester is dehydrated at reduced pressure and is mixed at an elevated temperature with a quantity of an organic polyisocyanate in excess of the amount which will react with the hydroxyl groups in the polyesters. After a short period of reaction, a quantity of the aforementioned glycols or diamines is added so that free isocyanate groups are still present after the chain lengthening reaction has taken place. The mixture is immediately poured into moulds and heated for 12 to 15 hours at about 100° C.

The highly elastic materials which are thus obtained have excellent mechanical properties which generally correspond to those of the products obtained exclusively from the saturated polyesters already mentioned. Such properties in the final products were not to be expected, since if only weakly unsaturated polyesters, capable of being produced by the thermal condensation of adipic acid, maleic acid and glycols, are used, the products formed have poor mechanical properties. This is the case even if the percentage of double bonds in the unsaturated polyester is the same as the percentage in the mixtures of saturated and unsaturated polyesters which are obtained by the process of the present invention.

The invention is further illustrated by the following examples without limitation thereto, the parts being by weight:

EXAMPLES

(A) Preparation of the saturated polyester 146 parts of adipic acid and 68 parts of glycol are gradually heated to 210° C. in a stream of nitrogen. Esterification takes place above 130° C., water being split off. The pressure is gradually reduced, and the temperature at the outlet of the esterification vessel falls below 80° C. After approximately another 8 hours at a pressure of 13 mm. and a temperature of 200–210° C. the vacuum esterification is stopped. The acid number of the polyester obtained is 1.8 and the hydroxyl number 56. The mixture is thoroughly stirred throughout the esterification.

(B) Preparation of an unsaturated polyester 740 parts of adipic acid, 98 parts of maleic acid anhydride and 415 parts of glycol are gradually heated to 210° C. in a stream of nitrogen, the mixture being well stirred. Esterification starts at about 140° C. and water distils over. When the transition temperature has fallen to 80° C., the pressure is carefully reduced to 14 mm. When the acid number has dropped to 2, the esterification process is stopped. The hydroxyl number is than 56. The ester solidifies after a time to form a light yellow wax.

(C) Preparation of a saturated polyester 1460 grams of adipic acid and 840 grams of propylene glycol are heated to 195° C. in a stream of carbon dioxide. Esterification takes place above 160° C., water being split off. The pressure is gradually reduced as the temperature at the outlet of the esterification vessel falls below 85° C. Condensation is continued until the acid number of the polyester has dropped below 2. The polyester thus obtained has an hydroxyl number of 56.

(D) Preparation of the unsaturated polyester 1460 grams of adipic acid, 232 grams of fumaric acid, 372 grams of ethylene glycol, and 650 grams of 1.4-butylene glycol are gradually heated to 195–200° C. in a stream of nitrogen. Esterification starts at about 160° C. water being split off. When the transition temperature has fallen to 85° C. the pressure is reduced to 40 mm. until an acid number of about 1 has been reached. A waxy material is obtained having an OH number of 50.

EXAMPLE 1

200 parts of the saturated polyester A and 40 parts of the unsaturated polyester B are dehydrated in vacuo for 30 minutes at 130° C. At this temperature, 38.5 parts of 1.5-naphthylene diisocyanate are then added, and, when the heat of reaction has finished, 4.4 parts of 1.4-butylene glycol are added while stirring thoroughly. The mixture is then poured into moulds and allowed to stand for 12 hours at 100° C. The cast product is highly elastic and has the following mechanical properties:

| | |
|---|---|
| Thickness | 0.57 |
| Tearing strength ___kg./cm.² | 279 |
| Elongation at break ___percent | 655 |
| Loading at 300% elongation ___kg./cm.² | 57 |
| Ring structure ___kg. abs. | 43 |
| Shore hardness at 20° C. | 74 |
| Elasticity at 20° C. | 51 |
| Permanent elongation: | |
| After 1 minute ___percent | 9 |
| After 1 hour ___do. | 9 |

EXAMPLE 2

200 parts of the saturated polyester A and 40 parts of the unsaturated polyester B are dehydrated in vacuo at 130° and then mixed with 38.5 parts of p-phenylene diisocyanate. 8.6 parts of 1.4-butylene glycol are stirred in when the heat of reaction has finished and the mixture is poured into moulds. It is heated for 12 hours at 100° C. The mechanical properties of the cast product are:

| | |
|---|---|
| Thickness ___cm. | 0.5 |
| Tearing strength ___kg./cm.² | 228 |
| Ring structure ___kg./abs. | 39 |
| Shore hardness at 20° C. | 76 |
| Elongation at break ___percent | 605 |
| Loading at 300% elongation ___kg./cm.² | 61 |
| Elasticity at 20° C. | 52 |
| Permanent elongation: | |
| After 1 minute ___percent | 16 |
| After 1 hour ___do. | 13 |

EXAMPLE 3

200 parts of the saturated polyester A and 40 parts of the unsaturated polyester B are dehydrated as described in Example 2 and then mixed with 38.5 parts of p-phenylene diisocyanate. When the heat of reaction has finished, 9 parts of 1,4-butylene glycol are added at 130° C. while stirring and the mixture is poured into moulds. The cast product has the following mechanical properties:

| | |
|---|---|
| Thickness ___cm. | 0.58 |
| Tearing strength ___kg./cm.² | 251 |
| Elongation at break ___percent | 640 |
| Loading at 300% elongation ___kg./cm.² | 70 |
| Ring structure ___kg. abs. | 40 |
| Shore hardness at 20° C. | 80 |
| Elasticity at 20° C. | 47 |
| Permanent elongation: | |
| After 1 minute ___percent | 21 |
| After 1 hour ___do. | 16 |

EXAMPLE 4

The procedure of Example 1 is repeated except that a mixture consisting of 216 parts of the saturated polyester A and 24 parts of the unsaturated polyester B is used. A product having substantially the same characteristics as that described in Example 1 is obtained.

EXAMPLE 5

Following the procedure of Example 1, a mixture consisting of 192 parts of the saturated polyester A and 48 parts of the unsaturated polyester B is used as starting material. The product obtained exhibits substantially the same properties as that described in Example 1.

EXAMPLE 6

Following the procedure of Example 1, 240 parts of the polyester mixture is reacted with 38.5 parts of 1,5- naphthalene-diisocyanate and 5.3 parts of quinitol (in place of 4.4 parts of 1,4-butylene glycol).

EXAMPLE 7

In accordance with the procedure described in Example 1, 240 parts of the polyester mixture are reacted with 48 parts of diphenylmethane-diisocyanate and 13.2 parts of 1,5-naphthalene-beta-dihydroxyl-ethyl-ether.

EXAMPLE 8

Following the procedure of Example 1, 240 parts of the polyester mixture are reacted with 33.6 parts of tolylene-diisocyanate and 13 parts of o-dichlorobenzidine or 9.6 parts of 2,6-dichloro-1,4-phenylene-diamine.

EXAMPLE 9

Following the procedure of Example 1, 240 parts of the polyester mixture are reacted with 40.8 parts of 1,5-naphthalene-diisocyanate and 2.4 parts of water.

EXAMPLE 10

200 parts of the unsaturated polyester C and 100 parts of the unsaturated polyester D are mixed and dehydrated while stirring for 30 minutes at 100° C./20 mm. At this temperature 54 parts of 1,5-naphthalene diisocyanate are then added. The temperature rises to 140° C. When the heat of reaction has finished 6 parts of 1,4-butylene glycol are added while stirring thoroughly. The mixture is then poured into moulds and allowed to stand for 12 hours at 100° C. A test plate exhibits the following mechanical properties:

Thickness _____cm__ 0.4
Tearing strength_____kg./cm.$^2$__ 110
Elongation at break_____percent__ 530
Elasticity at 20° C._____do____ 54
Permanent elongation:
  After 1 minute_____do____ 10
  After 1 hour_____do____ 6

EXAMPLE 11

A mixture of 400 parts of polyester C and 100 parts of unsaturated polyester D are dehydrated while stirring at 110° C./20 mm. 200 parts of 4,4'-diphenylmethane-diisocyanate are then added. The temperature rises quickly to 145° C. After the temperature has dropped again to 130° C., 40 grams of molten quinitol are added. The reaction mixture is poured into molds and allowed to stand for 12 hours at 110° C. A test plate is obtained having the following physical properties:

Thickness _____cm__ 0.41
Tearing strength_____kg./cm.$^2$__ 245
Elongation at break_____percent__ 580
Permanent elongation:
  After 1 minute_____do____ 9
  After 1 hour_____do____ 6

Although the invention has been described in considerable detail in the forgoing for the purpose of illustration, it to be understood that such detail is solely for this purpose and that variations can be made therein by those skilled in the art without departing from the spirit and scope of the invention except as is set forth in the claims.

What is claimed is:

1. A method for making an elastic polyurethane elastomer which comprises reacting an excess of an organic diisocyanate with a saturated polyester and an unsaturated polyester, the amount of unsaturated polyester being not more than 33 percent by weight of the total amount of polyester, and mixing the resulting —NCO terminated adduct with a member selected from the group consisting of water and an organic compound having a molecular weight of less than about 500 and two reactive hydrogen containing groups in the molecule, said reactive hydrogen containing groups being reactable with isocyanate groups, the amount of said group member being insufficient to react with all of the —NCO groups of the adduct; said saturated polyester having been prepared by esterification of a saturated dicarboxylic acid and a glycol, said unsaturated polyester having been prepared by esterification of a glycol and an unsaturated dicarboxylic acid and a saturated dicarboxylic acid in the ratio of from about 1:1 to about 1:15, respectively, said polyesters having an acid number of from zero to about 10 and an hydroxyl number of from about 20 to about 100, and thereafter heating the resulting mixture until combined polymerization through the unsaturation of the adduct and cross linking through reaction of the terminal —NCO groups of the adduct are effected with the formation of a solid polyurethane elastomer.

2. A process as defined in claim 1 wherein the polyester mixture comprises polyesters derived from aliphatic reactants.

3. A process as defined in claim 1 wherein the diisocyanate and organic compound having a molecular weight of less than about 500 employed are an aryl diisocyanate and an alkylene glycol respectively.

4. A process as defined in claim 3 wherein the aryl diisocyanate and alkylene glycol employed are 1.5-naphthylene diisocyanate and 1.4-butylene glycol respectively.

5. A process as defined in claim 3 wherein the aryl diisocyanate and alkylene glycol employed are p-phenylene diisocyanate and 1.4-butylene glycol respectively.

6. An elastic polyurethane elastomer prepared by the method which comprises reacting an excess of an organic diisocyanate with a saturated polyester and an unsaturated polyester, the amount of unsaturated polyester being not more than 33 percent by weight of the total amount of polyester, and mixing the resulting —NCO terminated adduct with a member selected from the group consisting of water and an organic compound having a molecular weight of less than about 500 and two reactive hydrogen containing groups in the molecule, said reactive hydrogen containing groups being reactable with isocyanate groups, the amount of said group member being insufficient to react with all of the —NCO groups of the adduct; said saturated polyester having been prepared by esterification of a saturated dicarboxylic acid and a glycol, said unsaturated polyester having been prepared by esterification of a glycol and an unsaturated dicarboxylic acid and a saturated dicarboxylic acid in the ratio of from about 1:1 to about 1:15, respectively, said polyesters having an acid number of from zero to about 10 and an hydroxyl number of from about 20 to about 100, and thereafter heating the resulting mixture until combined polymerization through the unsaturation of the adduct and cross-linking through reaction of the terminal —NCO groups of the adduct are effected with the formation of a solid polyurethane elastomer.

7. A method for making an elastic polyurethane elastomer which comprises reacting about 38.5 parts of 1,5-naphthylene diisocyanate with about 200 parts of a saturated polyester and about 40 parts of an unsaturated polyester, and mixing the resulting —NCO terminated adduct with about 4.4 parts of 1,4-butylene glycol and thereafter heating the resulting mixture until combined polymerization through the unsaturation of the adduct and cross-linking through reaction of the terminal —NCO groups of the adduct are effected with the formation of a solid polyurethane elastomer; said saturated polyester having an acid number of about 2 and an hydroxyl number of about 56 and having been prepared from about 146 parts adipic acid and 68 parts ethylene glycol; said unsaturated polyester having an acid number of about 2 and an hydroxyl number of about 56 and having been prepared from about 740 parts adipic acid, 98 parts maleic anhydride and 415 parts ethylene glycol.

8. A method for making an elastic polyurethane elastomer which comprises reacting about 38.5 parts of p-phenylene diisocyanate with about 200 parts of a saturated polyester and about 40 parts of an unsaturated polyester, and mixing the resulting —NCO terminated adduct with about 8.6 parts of 1,4-butylene glycol and thereafter heating the resulting mixture until combined polymerization through the unsaturation of the adduct and cross-linking through the reaction of the terminal —NCO groups of the adduct are effected with the formation of a solid polyurethane elastomer; said saturated polyester having an acid number of about 2 and an hydroxyl number of about 56 and having been prepared from about 146 parts adipic acid and 63 parts ethylene glycol; said unsaturated polyester having an acid number of about 2 and an hydroxyl number of about 56 and having been prepared from about 740 parts adipic acid, 98 parts maleic anhydride and 415 parts ethylene glycol.

References Cited in the file of this patent

UNITED STATES PATENTS

| | | |
|---|---|---|
| 2,621,166 | Schmidt et al. | Dec. 9, 1952 |
| 2,625,531 | Seeger | Jan. 13, 1953 |
| 2,642,403 | Simon et al. | June 16, 1953 |
| 2,780,613 | Rubens | Feb. 5, 1957 |